United States Patent [19]
Frentzel et al.

[11] Patent Number: 5,363,877
[45] Date of Patent: Nov. 15, 1994

[54] SUCTION REGULATING VALVE

[76] Inventors: Herman E. Frentzel, 424 Bee St., Sausalito, Calif. 94965; Dieter J. Rief, 8016 Mitchell, Rohnert Park, Calif. 94928

[21] Appl. No.: 141,074

[22] Filed: Oct. 26, 1993

[51] Int. Cl.[5] ............................................. F16K 15/14
[52] U.S. Cl. ...................................... 137/526; 15/1.7; 137/845
[58] Field of Search ................... 15/1.7; 137/217, 526, 137/845, 846, 849

[56] References Cited

U.S. PATENT DOCUMENTS

| | | | |
|---|---|---|---|
| 3,250,219 | 5/1966 | McCarty | 137/845 X |
| 4,387,879 | 6/1983 | Tauschinski | 137/846 X |
| 5,033,504 | 7/1991 | Kallenbach | 137/846 X |

*Primary Examiner*—Robert G. Nilson
*Attorney, Agent, or Firm*—Douglas E. White

[57] ABSTRACT

A suction pressure regulating valve automatically maintains the suction pressure of a swimming pool cleaning system to be consistent with the optimum range of water suction pressure when the valve is used with suction type automatic swimming pool cleaners. The valve is a water immersed device which permits water to bleed through an orifice, which orifice opens in proportion to suction pressure within the valve. The valve has a conical body which readily adapts in line with the flexible hose that connects the swimming pool filter system with the suction type automatic swimming pool cleaner. This type of pool cleaner moves about the sides and the bottom of a swimming pool, continuously cleaning those surfaces. The valve orifice is protected from air incursion by an anti-vortex plate when the valve is near the surface of the pool.

20 Claims, 2 Drawing Sheets

SUCTION REGULATING VALVE

FIELD OF THE INVENTION

This invention relates to a device which automatically regulates the suction pressure of water supplied by a swimming pool filter system pump, which pump powers a suction type automatic pool cleaner.

BACKGROUND OF THE INVENTION

Suction type automatic swimming pool cleaners, of which there are a number of different makes on the market, are driven by water drawn to the suction side of the swimming pool filter system pump. Such systems vary in the suction pressure developed, due to differences in pump horsepower, pipe line sizes, filter capacity and condition, and other like factors.

These pool cleaners run most effectively at suction pressures somewhat less than the pressures developed by most pool filter systems. It is, therefore, desirable to reduce this pressure and to regulate the suction pressure automatically within a desired range.

This feature is particularly needed because the filter back pressure increases over time as the filter does its cleaning of the pool water. As this back pressure increases, the suction developed by the pump is lessened. This requires a valve which will maintain the suction pressure to the automatic pool cleaner at its optimum operating range. This is accomplished by bleeding less bypass water through the valve orifice. After a periodic cleaning of the filter, the suction pressure increases. Correspondingly, the valve must reduce the pump suction pressure to the automatic pool cleaner to the desired operating range (which typically is done by bleeding more bypass water).

Other suction regulating valves are presently on the market and are designed to regulate the water suction pressure for suction type automatic swimming pool cleaners. Such other valves incorporate springs, bellows, slide valves, poppet valves and other costly and complex means of pressure regulation. Examples of other such valves are the Arneson brand poppet and spring type regulating valve and the Kreepy Krauly brand bellow and spring type regulating valve. Both of these suction regulating valves are designed for use with pool filter systems and automatic swimming pool cleaners of the suction type.

SUMMARY OF THE INVENTION

The present invention is a suction pressure regulating valve which automatically maintains the suction pressure of a swimming pool cleaning system to be consistent with the optimum range of water suction pressure when the valve is used with suction type automatic swimming pool cleaners. The valve is a water immersed device which permits water to bleed through an orifice in proportion to suction pressure within the valve.

The valve is readily connected in line with the flexible hose that connects the swimming pool filter system with the suction type automatic swimming pool cleaner. This type of pool cleaner moves about the sides and the bottom of a swimming pool, continuously cleaning those surfaces.

The valve orifice is protected by an anti-vortex plate from air incursion when the valve is near the surface of the pool.

FEATURES AND ADVANTAGES

A feature of this invention is the provision of a suction regulator valve apparatus for use in regulating the pressure of water supplied by a swimming pool filter system to a suction type automatic pool cleaner, which system and cleaner are joined together in fluid communication by a swimming pool cleaner hose. The valve includes a body having a hollow interior and means for adapting the body in line with the swimming pool cleaner hose. A portion on the body, preferably a cap, is comprised of flexible material. Also included is an orifice of pre-selected configuration in the flexible portion, the orifice opening and closing as the flexible material flexes in response to changes in water pressure differential between the interior and exterior of the body.

Another feature is that the orifice preferably is at least one slit cut through the flexible material. In the preferred embodiment there are two slits, which slits intersect. Optional holes at ends of the slits prevent tearing of the flexible material.

Still another feature is an anti-vortex plate on the exterior of the body, the anti-vortex plate oriented a fixed distance away from the orifice to prevent air vortices from entering through the orifice.

As a preferred feature, the flexible portion is planar and is disposed parallel to a planar panel of the anti-vortex plate.

Yet another feature is that the adapting means includes a male end on the body, the male end insertable into a first portion of the hose, and a female end on the body, a second portion of the hose insertable into the female end.

Another feature is the aforementioned cap, which is removably attached to the body. The cap forms the portion of flexible material. The body is relatively rigid and the orifice is formed through the cap.

Other features are a collar on the body; a raised ridge on the collar; and a groove in the cap having a cross-sectional shape congruent with that of the ridge, whereby the cap may be secured onto the collar of the body and sealed by mating the ridge and groove, keeping the cap from separating from the body and leaving the whole valve water-tight, except for the orifice, when the valve apparatus is adapted in line with the hose.

A feature of the preferred embodiment is that the cap is in the configuration of a cup.

The principal object of the present invention is to provide a device which will maintain suction water pressure within an optimum range when used with automatic suction type swimming pool cleaners.

It is also an object of the invention to provide a device of inexpensive construction that is simple and effective in operation.

A further object of the invention is to provide a device that can be installed quickly and easily.

A further object of the invention is to provide a device whose components can be quickly and readily replaced when necessary.

A further object of the invention is to provide a device with means to prevent suction vortices.

A further object of the invention is to provide a device that will prevent excessive suction pressures from damaging the components of a swimming pool cleaning and filtering system.

A further object of the invention is a device that will permit fluid to flow in two directions through both the valve body and the valve itself.

Yet a further object is the provision of a device which will not corrode through electrolysis, nor otherwise quickly fail in a chemically-treated pool water environment.

Still another feature is a valve which is capable of being used with a wide variety of suction type cleaners.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

Certain terminology and derivations thereof may be used in the following description for convenience in reference only and will not be limiting. For example, words such as "inwardly" and "outwardly" will refer to directions toward and away from, respectively, the geometric center of a device or area and designated parts thereof.

Figure 1:
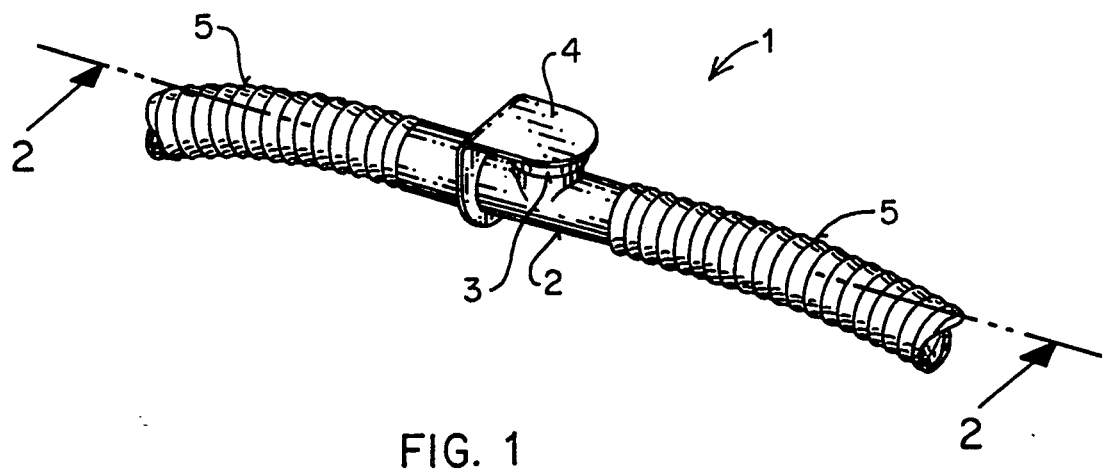
FIG. 1 is a perspective view of the suction regulating valve of this invention, as normally installed in line with a flexible suction hose which runs between a swimming pool filter system (not illustrated) and an automatic suction type pool cleaner (not illustrated)

| Drawing Reference Numerals | |
|---|---|
| 1 | suction regulating valve |
| 2 | body of 1 |
| 3 | cap of 1 |
| 4 | anti-vortex plate of 1 |
| 5 | suction hose |
| 6 | male end of 2 |
| 7 | female end of 2 |
| 8 | collar of 2 for 3 |
| 9 | ridge of 8 |
| 10 | slit orifice in 3 |
| 11 | step at 7 |
| 12 | hole in 4 |
| 13 | key in 11 |
| 14 | key way in 4 for 13 |
| 15 | holes in 10 of 3 |
| 16 | groove in 3 for 9 |
| 17 | upper panel of 4 |
| 18 | lower panel of 4 |

DESCRIPTION OF A PREFERRED EMBODIMENT

As shown in FIG. 1, the preferred suction regulating valve 1 includes a conical body 2, preferably fabricated of rigid molded plastic; a cap 3, comprising a portion of the valve on the body which preferably is molded from rubber or from a similar elastomer that flexes under pressure; and an anti-vortex plate 4, preferably fabricated of rigid molded plastic. The flexible suction hose 5 is not part of the invention, but merely illustrates how the suction regulator valve 1 is hooked up within the environment of a typical pool cleaning installation.

Figure 2:
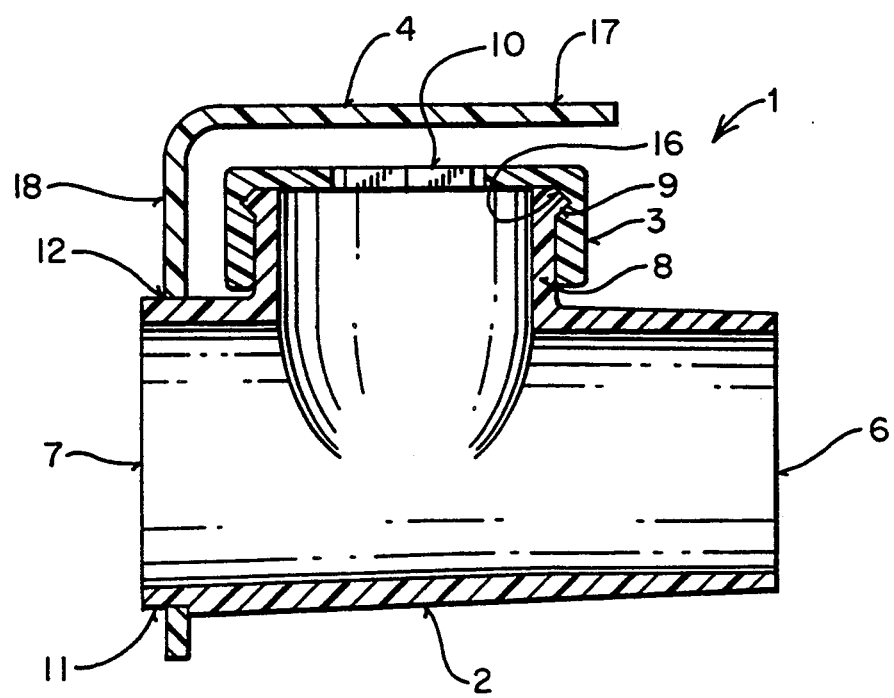
FIG. 2 is a longitudinal cross-section of the suction regulating valve of the present invention, taken along line 2—2 of FIG. 1.

FIG. 2 shows the configuration of the conical body 2 which has an open male end 6 and a larger open female end 7. The ends 6, 7 accept the ends of the swimming pool cleaner hose 5 (shown in FIG. 1) and comprise one means for adapting the body in line with the hose. One end of the hose 5 fits into the female valve end 7. The smaller male valve end 6 fits into the other hose end. Alternate adapting means might be substituted for the preferred embodiment; for example, the hose and body could be supplied with mating screw threads.

As can be seen in FIG. 2, the hollow interior of the valve 1 comprises a main fluid passageway that extends longitudinally between the ends 6 and 7. The cap 3 fits tightly on a laterally projecting collar 8, the interior of which collar provides a secondary fluid passageway that is open to the main fluid passageway of the hollow body 2, thereby providing an unobstructed means of fluid communication there between. The collar 8 has a raised peripheral ridge 9 that retains the cap 3 on the body 2. The peripheral ridge 9 snaps into a matching groove 16 which is formed inside the cap 3.

The size and configuration of the slit orifice 10 is designed to regulate the suction pressure of the water flowing through the body 2 by means of bleeding automatically variable amounts of water through the orifice 10. The suction pressure regulation is also affected by the thickness and flexibility of the material forming the cap 3 (or, at least, that forming the portion thereof containing the orifice). The existence of a pressure differential between the interior and the exterior of the valve 1 will cause the cap material to deform in the direction of lessor pressure (typically, toward the interior of the valve 1 due to suction in the hose 5).

This suction-induced differential opens the orifice 10 by bending material out of the plane of the cap top, which deformation allows water to bleed into the valve. This action tends to reduce the pressure differential; but, of course, not enough to eliminate it. Increasing or decreasing the suction in the hose will tend to cause the orifice to open or to close, respectively, thereby automatically compensating for said change in suction.

The size and shape of the orifice, the resistance to deformation of the flexible cap material, and the thickness of the cap all may readily be pre-selected so as to achieve a pressure differential which is always within the optimum working range of the pool cleaner (not illustrated).

An anti-vortex plate 4 is formed to closely cover the orifice 10, which plate prevents air carrying vortices from being formed when the valve 1 is near the surface of a pool. Such vortices could bring air into the pool filtration system and interfere with the proper operation thereof. By mounting the anti-vortex plate 4 a fixed distance away from the orifice, so as to have its upper panel 17 (having an optimally defined area) partially screen but not block the orifice, current flow may be disrupted and such vortices prevented. The anti-vortex plate 4 is held on the body 2 by means of a tight fit of its lower panel 18 about the body 2 at step 11. The step 11 is concentric with the body 2 and with a hole 12 in the anti-vortex plate 4.

Figure 3:
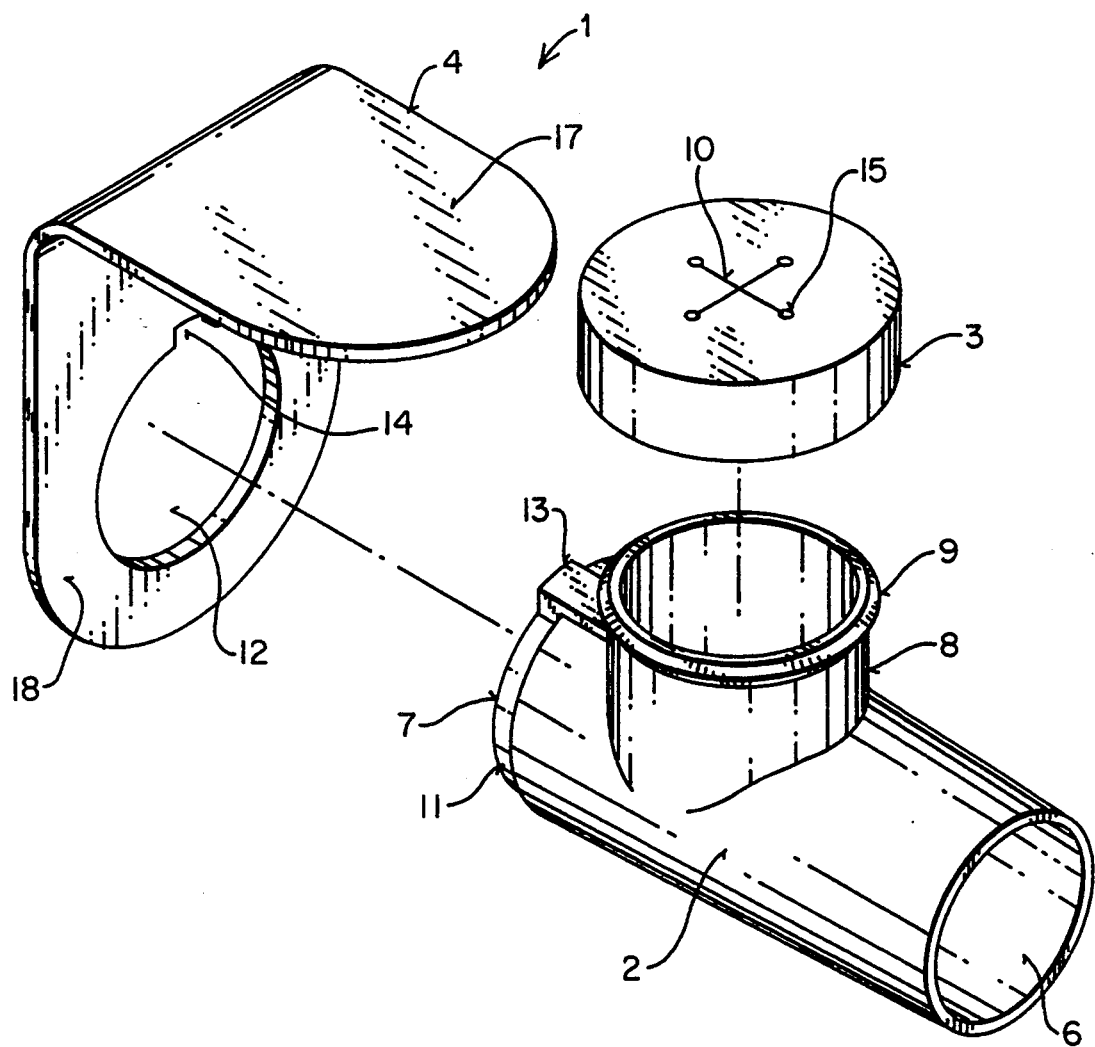
FIG. 3 is an exploded perspective view of the valve device of FIGS. 1 and 2.

FIG. 3 illustrates a key 13 formed on the body 2, which key mates with a key way 14 in the lower panel 18 of the plate 4 to properly orient the upper panel 17 of the plate with respect to the orifice 10. The orifice 10 is shown in the drawing of the preferred embodiment as intersecting knife slits which are punched or cut through the top of the cap 3. Terminal holes 15 prevent or delay the possible tearing of the orifice 10 when the valve 1 is in use.

While the above provides a full and complete disclosure of the preferred embodiments of this invention, various modifications, alternate constructions, and equivalents may be employed without departing from the true spirit and scope of the invention. Such changes might involve alternate materials, components, structural arrangements, sizes, operational features or the like. For one example, other orifice shapes may readily be substituted for that shown, such as curvilinear slits or slits which do not intersect. As another example, the cap could be partially open on top and could screw on and off of the collar. The flexible material containing the orifice then could be a separate disk that would be captured between the open cap and the collar.

Therefore, the above description and illustrations should not be construed as limiting the scope of the invention which is defined by the appended claims.

What is claimed is:

1. In combination with a swimming pool filter system joined in fluid communication with a suction type automatic pool cleaner by a swimming pool cleaner hose, suction regulator valve apparatus including:
   a first portion of the hose;
   a second portion of the hose;
   a body of rigid molded plastic, the body having an exterior and a hollow interior and having a generally conical shape;
   an open male end on the body, the male end insertable into the first portion of the hose;
   an open female end on the body which is larger than the male end, the second portion of the hose insertable into the female end;
   a cup-shaped cap removably attached to the body, which cap is at least partially comprised of material capable of deforming readily under pressure;
   a deformable planar top of the at least partially deformable cap;
   an orifice formed of at least one slit in the planar top, the orifice capable of opening and closing as the deformable cap top flexes at least partially out of its plane in response to changes in water pressure differential between the interior and exterior of the body;
   and
   an anti-vortex plate of rigid molded plastic on the exterior of the body, the anti-vortex plate having a panel oriented a fixed distance away from the planar cap top and parallel thereto to prevent air vortices from entering through the orifice.

2. The apparatus of claim 1 wherein:
   there are two slits, which slits intersect, and further including
   holes at ends of the slits to prevent tearing of the cap;
   a collar on the body;
   a raised ridge on the collar;
   and
   a groove in the cap having a cross-sectional shape congruent with that of the ridge, whereby the cap may be secured onto the collar of the body and sealed by mating the ridge and groove, thus keeping the cap from separating from the body.

3. Suction regulator valve apparatus for use in regulating the pressure of water supplied by a swimming pool filter system to a suction type automatic pool cleaner, which system and cleaner are joined together in fluid communication by a swimming pool cleaner hose, including:
   a body having an exterior and a hollow interior, at least one portion of which interior comprises a longitudinal main fluid passageway;
   means for adapting the body in line with the swimming pool cleaner hose;
   a portion on the body which does not enter the main fluid passageway, which portion is comprised of flexible material;
   and
   an orifice of pre-selected configuration in the flexible portion, the orifice opening and closing as the flexible material flexes in response to changes in water pressure differential between the interior and exterior of the body.

4. The apparatus of claim 3 wherein:
   the orifice is at least one slit cut through the flexible material.

5. The apparatus of claim 4 wherein:
   there are two slits, which slits intersect.

6. The apparatus of claim 5 further including:
   holes at ends of the slits to prevent tearing of the flexible material.

7. The apparatus of claim 3 wherein:
   the adapting means includes
   at least one male end on the body, the male end insertable into a first portion of the hose.

8. The apparatus of claim 3 further including:
   a cap removably attached to the body, the cap forming the portion of flexible material, the body being relatively rigid, and the orifice formed through the cap.

9. Suction regulator valve apparatus for use in regulating the pressure of water supplied by a swimming pool filter system to a suction type automatic pool cleaner, which system and cleaner are joined together in fluid communication by a swimming pool cleaner hose, including:
   a body having an exterior and a hollow interior;
   means for adapting the body in line with the swimming pool cleaner hose:
   a portion on the body which is comprised of flexible material;
   an orifice of pre-selected configuration in the flexible portion, the orifice opening and closing as the flexible material flexes in response to changes in water pressure differential between the interior and exterior of the body;
   and
   an anti-vortex plate on the exterior of the body, the anti-vortex plate oriented a fixed distance away from the orifice to prevent air vortices from entering through the orifice.

10. The apparatus of claim 9 wherein:
    the flexible portion is planar and is disposed parallel to the anti-vortex plate.

11. Suction regulator valve apparatus for use in regulating the pressure of water supplied by a swimming pool filter system to a suction type automatic pool cleaner, which system and cleaner are joined together in fluid communication by a swimming pool cleaner hose, including:
    a body having an exterior and a hollow interior;
    means for adapting the body in line with the swimming pool cleaner hose;

a portion on the body is comprised of flexible material;

an orifice of pre-selected configuration in the flexible portion, the orifice opening and closing as the flexible material flexes in response to changes in water pressure differential between the interior and exterior of the body;

a cap removably attached to the body, the cap forming the portion of flexible material, the body being relatively rigid, and the orifice formed through the cap;

a collar on the body;

a raised ridge on the collar;

and a groove in the cap having a cross-sectional shape congruent with that of the ridge, whereby the cap may be secured onto the collar of the body and sealed by mating the ridge and groove, keeping the cap from separating from the body and leaving the whole valve watertight, except for the orifice, when the valve apparatus is adapted in line with the hose.

12. The apparatus of claim 11 wherein:
the cap is in the configuration of a cup.

13. Pressure regulator valve apparatus, including:
a body having an exterior and a hollow interior;
a cap removably affixed to the body, the cap having a planar upper face, the face disposed outwardly and exteriorly with respect to the valve;
a portion on the upper face of the cap which does not enter the hollow interior of the body when there is no water pressure differential between the interior and exterior of the body and which portion is comprised of flexible material;
and
an orifice formed through the flexible portion, the orifice automatically opening and closing as the flexible material flexes in response to changes in fluid pressure differential between the interior and exterior of the body.

14. Pressure regulator valve apparatus, including:
a body having an exterior and a hollow interior;
a portion on the body comprised of flexible material;
an orifice formed through the flexible portion, the orifice automatically opening and closing as the flexible material flexes in response to changes in fluid pressure differential between the interior and exterior of the body;
and
an anti-vortex plate on the exterior of the body, the anti-vortex plate oriented a fixed distance away from the orifice to prevent air vortices from entering through the orifice.

15. The apparatus of claim 14 further including:
means for adapting the body in line with a swimming pool cleaner hose.

16. The apparatus of claim 15 wherein:
the adapting means includes
a male end on the body for inserting into the hose;
and
a female end on the body into which the hose may be inserted.

17. The apparatus of claim 16 further including:
first and second planar panels of the plate disposed at right angles to each other,
the first panel disposed parallel to the flexible portion forming the orifice,
and
the second panel having an opening through which one end of the body may pass.

18. The apparatus of claim 17 further including:
a key formed in the body;
and
a key way in the opening, the key fitting in the key way,
whereby the first panel is held in place parallel to the flexible portion.

19. The apparatus of claim 18 wherein:
the orifice is at least one slit cut through the flexible material.

20. The apparatus of claim 19 wherein:
there are two slits, which slits intersect,
and further including
holes at ends of the slits to prevent tearing of the flexible material.

* * * * *